United States Patent
Colosso et al.

(10) Patent No.: US 7,603,318 B1
(45) Date of Patent: Oct. 13, 2009

(54) LICENSE DISTRIBUTION

(75) Inventors: Juan-Carlos Colosso, Mt. View, CA (US); Katherine K. Nadell, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 239 days.

(21) Appl. No.: 11/585,734

(22) Filed: Oct. 24, 2006

(51) Int. Cl.
*G06Q 99/00* (2006.01)

(52) U.S. Cl. .......................................... 705/59; 705/51

(58) Field of Classification Search ............... 705/59
See application file for complete search history.

(56) References Cited

U.S. PATENT DOCUMENTS

| | | | |
|---|---|---|---|
| 7,035,918 B1 * | 4/2006 | Redding et al. ............. 709/223 |
| 2002/0065781 A1 * | 5/2002 | Hillegass et al. ............. 705/59 |
| 2002/0107809 A1 * | 8/2002 | Biddle et al. ................. 705/59 |
| 2004/0078339 A1 * | 4/2004 | Goringe et al. ............... 705/59 |
| 2004/0117467 A1 * | 6/2004 | Rich et al. ................... 709/223 |
| 2005/0102240 A1 * | 5/2005 | Misra et al. .................. 705/59 |

* cited by examiner

*Primary Examiner*—Andrew J. Fischer
*Assistant Examiner*—Chrystina Zelaskiewicz
(74) *Attorney, Agent, or Firm*—Chapin IP Law, LLC; Barry W. Chapin, Esq.

(57) ABSTRACT

A licensing manager server enables distribution of multiple software licenses from multiple separately located and/or different types of licensing server sources. Based on communications with the licensing manager server, a customer can control how a group of purchased software licenses can be distributed to members in a corresponding organization (e.g., company). For example, upon receiving a query about the order from a customer, a web portal of a vendor managed server provides a notification to the customer that the multiple software licenses can be selectively apportioned for distribution by multiple different licensing server sources. In response to the notification, the licensing manager server receives customer input indicating to allocate one portion of the multiple software licenses for distribution by a first licensing server source and to allocate another portion of the multiple software licenses for distribution by a second licensing server source.

27 Claims, 8 Drawing Sheets

_US 7,603,318 B1_

LICENSE DISTRIBUTION

RELATED APPLICATIONS

This application is related to U.S. Patent Applications entitled "SURRENDER AND MANAGEMENT OF SOFTWARE LICENSES," Ser. No. 11/585,512, "OVERDRAFT LICENSES AND LICENSE DISTRIBUTION," Ser. No. 11/585,561, "SOFTWARE LICENSE DISTRIBUTION AND REGISTRATION BYPASSING," Ser. No. 11/585,559, all of which are being filed on the same date as the present application (by the common assignee Adobe Systems, Inc.), the entire teachings of all of which are incorporated herein by this reference.

BACKGROUND

Software vendors typically require a purchase of a corresponding software license in order to enable a respective user the right to download, install, and/or use a software application. For example, in a retail setting, a respective user can purchase a CD-ROM (Compact Disk Read Only Memory) or other type of storage that is encoded with a software program for downloading or installation onto a respective computer system owned by the user. Such a CD-ROM can include an associated serial number. The serial number provided by the vendor enables downloading and/or installation of the software application stored on the CD-ROM.

As an example, when downloading or attempting to execute the software program, a respective installer program for installing the software application on the user's computer system may require the user to input the correct serial number associated with the CD. Upon receipt of the serial number by the installer program, the installer program may send the serial number over a network to a server managed by the vendor of the software program being downloaded. When the serial number is transmitted, the vendor's server uses the serial number to track and identify which specific copy of the software application is being downloaded onto a respective computer system.

In addition to the serial number, the vendor's server may require further input (e.g., a user's, name, address, business, etc.) from a respective user to register and/or install the software program for use. After obtaining such information from the user, the server typically provides an authentication code enabling the respective user to install and/or execute the software program on the user's computer system.

SUMMARY

Conventional techniques for electronically distributing software licenses and installing software suffer from a number of deficiencies. For example, conventional techniques enable clients of a respective organization to obtain licenses from a corresponding publicly accessible license distribution server. However, such techniques are limiting, for example, because certain organizations (e.g., defense contractors, financial institutions, etc.) do not always provide Internet access to their respective employee computer systems for security reasons. Consequently, such employee computers might be unable to access a license distribution server and obtain a respective license to use a corresponding software application.

One way to overcome the problem of distributing software licenses is to have a network administrator personally visit each client site and install a corresponding software application as well as provide the appropriate authentication code (as provided by the vendor granting the licenses) to enable the client computers to use the software application. For a large organization requiring many software licenses, this would be cumbersome and therefore costly to implement.

Techniques discussed herein deviate with respect to conventional applications such as those discussed above as well as additional techniques also known in the prior art. For example, certain specific embodiments herein are directed to overcoming deficiencies associated with the above-mentioned techniques and/or other deficiencies in the prior art.

In a general embodiment as described herein, a licensing manager (e.g., a process or portal operating on a publicly accessible server) enables distribution of multiple software licenses that can be served from multiple separately located and/or different types of licensing server sources. As an example, the system described herein allows a purchasing customer to purchase a set of licenses and the customer can thereafter decide that some of the licenses of the purchased set are to be served locally within that customer's organization (e.g. from a local license server operating within the company) while others are to be served via a publicly accessible license server (e.g. a license server operated by the vendor of the software that is available to that customer on a public network such as the Internet). The customer can thus control how a group of purchased software licenses can be distributed to members in a corresponding organization (e.g., company) using either local in-house license servers or remote vendor-managed license servers.

As a specific example, assume that a licensing manager/distributor/software vendor receives order information associated with an order for multiple software licenses from a customer. The licensing manager (e.g. a software process operating on a server provided by the software vendor) can provide a notification (e.g., one or more e-mail messages, website portal access, voicemail message, etc.) to that respective customer (e.g., to an Information Technology (IT) manager in the company who is logged into that portal) that the purchased multiple software licenses can be selectively allocated for distribution by multiple different licensing server sources (e.g. local in house or remote Internet based servers) depending on input from the customer. In response to a notification to the customer such as displaying information on a web page informing the customer of different types of license distribution options, the licensing manager process receives input (from a customer viewing the web page) indicating to allocate one portion of the multiple software licenses for distribution by a first licensing server source (e.g., a licensing server managed by the vendor) and to allocate another portion of the multiple software licenses for distribution by a second licensing server source (e.g., a licensing server managed by the customer on a corporate intranet). Accordingly, when different licensing servers are configured to distribute the software licenses, the users in or associated with the customer's organization can access one or more of the licensing server sources to obtain a software license during operation or installation of software requiring one of the purchased licenses. For example, if a particular client computer in the customer's organization does not have access to the web, the particular client can access a local server (e.g., a licensing server source in a private local area network) in the organization to obtain a software license. Alternatively, if the particular client operates a computer at home and does not have access to the server in the private local area network, then the particular home-based client can access a publicly accessible licensing server source to obtain a software license. The system described herein thus allows a single purchase of a set of licenses to be allocated between different vendor or customer licensing servers. The system further allows re-allocation or re-assignment of licenses within the purchased set between local or remote license servers without requiring the customer to return one group of licenses for credit and to then have to buy more of another type. In other words, the customer only need purchase some number of licenses for software which that customer can then later decide, using the system described herein, how to allocate and if desired, re-allocate between being served from the vendor licensing server or the customer's own licensing server. This contrasts with conventional license distribution models that require customers to purchase separate sets of licenses for remote or local distribution and once purchased using conventional license distribution techniques, cannot thereafter be reassigned in an electronic manner between such separate servers without requiring involvement of the vendor purchasing department to return for credit some number of licenses and requiring the customer to then re-purchase replacement licenses for serving in another manner. Conventional systems do not thus provide an easy way to allocate and, if need be, re-allocate or adjust how many licenses for a software product are to be served locally or remotely.

In a more specific configuration, a software vendor configures a publicly accessible server with a licensing manager application to manage a distribution of licenses in a network environment. Initially, as mentioned above, the licensing manager receives notification of an order by a customer for multiple software licenses. The notification associated with the order can specify details such as a total number of licenses, types of licenses, enabled features for each license, etc. in the order.

As mentioned above, the licensing manager enables selective distribution of the multiple software licenses according to input from a customer. For example, via a web portal accessed by a customer placing the order, the licensing manager can receive a query message from the customer. In response to the query message, the licensing manager notifies (e.g., via serving of a web page to) the customer that the multiple software licenses (e.g., already purchased licenses) can be selectively allocated for distribution by multiple types of licensing server sources such as a licensing server managed by the customer and a publicly accessible licensing server source managed by a software vendor granting the multiple software licenses. Based on further input from the customer, the licensing manager can receive one or more commands from the customer (e.g., a network administrator) to i) allocate a first portion of the multiple software licenses for distribution by a local server in a private network managed by the customer, and ii) allocate a second portion of multiple software licenses for distribution by a publicly accessible server.

After being notified of how the multiple software licenses shall be made available to respective clients via the different types of licensing servers, the licensing manager can forward a set of software utility tools to the customer. For example, if the customer chooses to have a portion of the ordered software licenses distributed from their own server, the vendor's licensing manager server forwards a set of software utility tools to the customer. The software tools enable the customer to configure one or more privately managed servers to distribute licenses within the customer's organization. In one embodiment, the software utility tools can include: i) an installation tool for installing license distribution software on a private server managed by the customer, ii) a software tool that facilitates a transfer of a pool of licenses from the licensing manager to the private server managed by the customer, and iii) a licensing server console tool enabling management of the license distribution software installed on the private server managed by the customer. Thus, the vendor-operated licensing manager server can enable a customer to convert a customer's private server into a licensing server source for distributing licenses to users.

In further embodiments, the server notifies a respective customer that multiple software licenses can be selectively allocated for distribution by multiple types of licensing server sources prior to actual configuration of either or both the first licensing server source or the second licensing server source to distribute the multiple software licenses. Conventional methods require that the servers be fully pre-defined and pre-configured according to a request at a time of the purchase order. Additionally, conventional methods do not allow a client to modify from which servers the licenses shall be distributed without significant intervention by the software vendor and corresponding network administrator of the customer managing the distribution. Embodiments herein enable a respective network administrator to easily change from which servers to distribute respective software licenses and do not require the purchaser to specify a method of distribution at purchase time. Instead, a customer can specify or re-specify a source to be used for distribution at any time, even after distributing a portion of the software licenses from a specified source. In other words, embodiments herein enable a respective network administrator to distribute licenses from first licensing server source and thereafter specify another source from which to distribute licenses.

Embodiments herein include a configuration of one or more computerized devices, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product that has a computer-readable medium including computer program logic encoded thereon that, when performed in a computerized device having a processor and corresponding memory, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present application is directed to a computer program product that includes a computer readable medium having instructions stored thereon for supporting operations such as distribution of software licenses. The instructions, when carried out by a processor of a respective computer device, cause the processor to perform the steps of: i) receiving order information associated with an order for multiple software licenses; ii) providing a notification that the multiple software licenses can be selectively allocated for distribution by multiple licensing server sources; and iii) in response to the notification, receiving input indicating to allocate a first portion of the multiple software licenses for distribution by a first licensing server source and to allocate a second portion of the multiple software licenses for distribution by a second licensing server source. Other embodiments of the present application include software programs to perform any of the method embodiment steps and operations summarized above and disclosed in detail below.

As discussed above, techniques herein are well suited for use in distribution of software licenses. However, it should be noted that embodiments herein are not limited to use in such applications and that the techniques discussed herein are well suited for other applications as well. Note that each of the different features, techniques, configurations, etc. discussed herein can be executed independently or in combination.

It is to be understood that the system herein can be embodied strictly as a software program, as software and hardware, or as hardware alone such as within a processor, or within an operating system or a within a software application. Example embodiments of the invention may be implemented within products and/or software applications such as those manufactured by Adobe Systems, Inc. of San Jose, Calif., USA.

Additional features of the embodiments herein will be further discussed in the Detailed Description section of this application and accompanying figures.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to an example embodiment, a licensing manager system (e.g., including a publicly accessible server) operated by a software vendor enables a customer to apportion how many software licenses to distribute from each of multiple different licensing server sources from a single set of purchased licenses. Based on communications with the licensing manager system server, a customer can easily control and change (if required) how a group of purchased software licenses can be distributed to members in a corresponding organization (e.g., company). For example, a server of the licensing manager system (e.g. a web purchasing and licensing portal operated on the Internet by the software vendor) initially receives order information associated with an order for multiple software licenses for a software product sold by that vendor. Upon receiving a query about the order from a customer, the licensing manager server provides a notification to the customer that the multiple software licenses can be selectively allocated for distribution by multiple different licensing server sources. In response to the notification such as displaying information on a web page informing the customer of different types of distribution options, the licensing manager server receives input (from the customer viewing the web page) indicating to allocate one portion of the multiple software licenses for distribution by a first licensing server source (e.g. locally within the customers private network) and to allocate another portion of the purchased multiple software licenses for distribution by a second licensing server source (e.g. to be served by a vendor licensing server operated by the software vendor on a network such as the Internet). Thus, for certain embodiments, a license server is located either within the customer network, or at the software vendor's site. A potential variation is to allow a third party company (channel partner, IT outsourcing company, etc.) to host a licensing server source also operated on a public network such as the Internet.

Enabling apportionment of a pool of purchased licenses for distribution from multiple licensing server sources provides increased flexibility since client computers in a customer's organization can potentially access different licensing server sources to obtain a license rather than be restricted to obtaining licenses from a single source. Additionally, the customer is able to reconfigure how the licenses are to be distributed (locally or remotely) without requiring return and repurchase of licenses for one or the other licensing server source.

Figure 1:
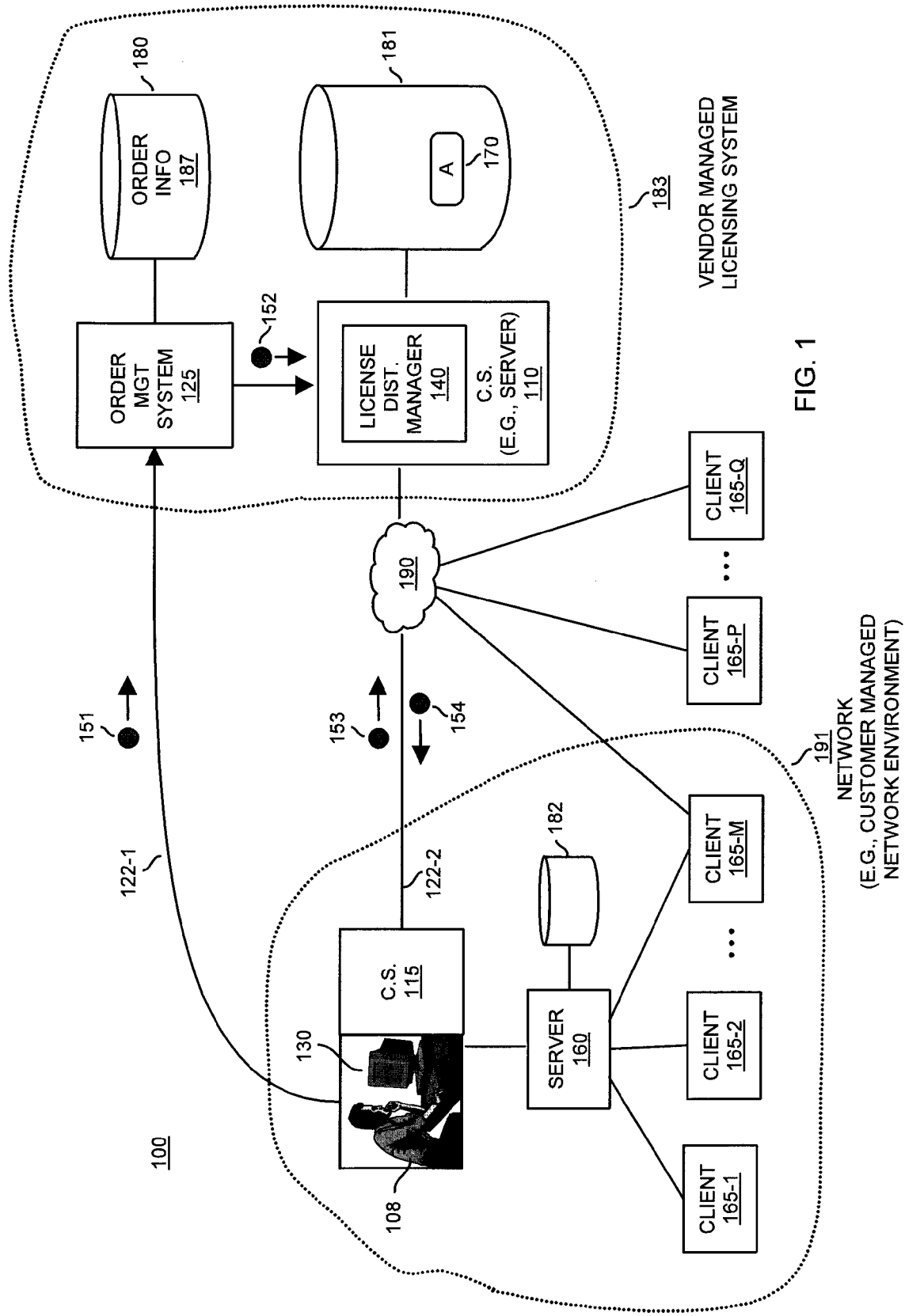
FIG. 1 is a diagram of a computer network environment enabling purchasing of software licenses and selection of distribution methods according to embodiments herein.

FIG. 1 is a diagram of a computer network environment 100 supporting distribution of software licenses according to embodiments herein. As shown, computer network environment 100 includes network 191, network 190, and a vendor managed licensing system 183. The vendor management licensing system 183 includes an order management system 125, repository 180 for storing order information 187, computer system 110 for executing license distribution manager 140, and repository 181 for storing license pool information 170. Network 191 includes user 108, display screen 130, computer system 115, server 160, and clients 165 (e.g., client 165-1, client 165-2, client 165-3, . . . , client 165-M). Computer network environment 100 also includes client 165-P, . . . client 165-Q associated with the customer that operates network 191.

In one embodiment, each of clients 165 (e.g., end users such as employees, terminal computer equipment, etc.) includes a computer device operated by respective users in an organization (e.g., a company, firm, etc.). In order to download and/or execute software applications on a respective client, the corresponding clients 165 first obtain a software license provided by a respective software vendor. The following disclosure illustrates example embodiments in which user 108 (e.g., a network administrator or employee of an organization purchasing the software licenses) controls a distribution of software licenses to clients 165.

As illustrated in FIG. 1, the user 108 (e.g., in this example, an employee or representative of a respective customer such as Acme Development Co.) initially places an order 151 for a group of software licenses (for distribution to clients 165) from a respective software vendor based on communications over link 122-1 (e.g., a telephone link, internet connection, postal service, etc.) to order management system 125. Assume in this example that the customer (Acme Development Co.) places an order for one hundred software licenses for use of a particular software application.

As briefly mentioned above, user 108 (or other representative of an organization as the case may be) can place an order 151 in many different ways. For example, the user 108 can communicate over a telephone link to an operator at vendor A to place an order for multiple software licenses. As another example, the user 108 also can log onto a website served by the order management system 125 and submit an order for multiple software licenses. As yet another example, a user 108 can send an order 151 via a delivery service (e.g., U.S. Postal Service) to order management system 125, and so on.

Order management system 125 of vendor managed licensing system 183 can include people and/or corresponding computer resources for managing orders from many different customers in addition to the order 151 from user 108.

As shown, for each of multiple orders, order management system 125 stores order information 187 in repository 180 (e.g., a database, data storage facility, memory, etc.). Order information 187 associated with order 151 can include customer information such as the name or identifier of a customer placing a purchase order, a purchase order number associated with an order, a payment status of the order, billing information, a number of licenses and corresponding versions/features of the software licenses being purchased, etc.

Assume in the present example that the order management system 125 assigns the purchase order number of 123456 to order 151 inputted by user 108 (or other representative) of the Acme Development Company as indicated above for the present example.

According to one configuration, after approval to grant software licenses associated with order 151, the order management system 125 communicates with license distribution manager 140 of computer system 110. Such a communication 152 can include an indication that the software licenses can be distributed based on further instructions provided by the customer making the purchase order. For example, in one embodiment, the order management system 125 forwards a pool of license information 152 (associated with order 151 by Acme Development Company) over a network connection (e.g., a local area network, public network such as the internet, etc.) to the license distribution manager 140. Based on receipt of the pool of license information, the license distribution manager 140, in turn, stores the pool of license information in repository 181 as license pool information 170 (e.g., labeled A). The pool of licenses A as specified by license pool information 170 have been reserved for use by clients 165 (e.g., employees of Acme Development Company) in computer network environment 100. As mentioned above, an approval message received by the license distribution manager 140 from the order management system 125 indicates that the license distribution manager 140 can enable management and distribution of the software licenses.

Prior to management and/or distribution of the software licenses in license pool 170, the license distribution manager 140 can notify user 108 that the software licenses associated with the order 151 have been approved and/or are ready for distribution based on selection by the user 108.

In one embodiment, the user 108 initiates distribution of the licenses in license pool 170 by sending a communication 153 over link 122-2 and network 190 to license distribution manager 140. In other embodiments, this communication wouldn't necessarily have to take place over a network. It is possible the request could be made via phone or other means.

In the context of sending communication 153, the user 108 at computer system 115 can request access to a web portal provided by (e.g., served by) license distribution manager 140. In such an example, the user 108 accesses a web page supported by the license distribution manager 140 based on input of a URL (Uniform Resource Locator) to a website associated with the license distribution manager 140. Upon receipt of the communication 153 (e.g., a web page request) initiated by user 108 at computer system 115, the license distribution manager 140 provides a notification message 154 (e.g., web page information for viewing a corresponding web page on display screen 130) indicating that multiple software licenses associated with the recent order 151 can be distributed in computer network environment 100 in a number of ways depending on a selection by user 108. An example of one type of notification provided by license distribution manager 140 is illustrated in FIG. 2.

Figure 2:
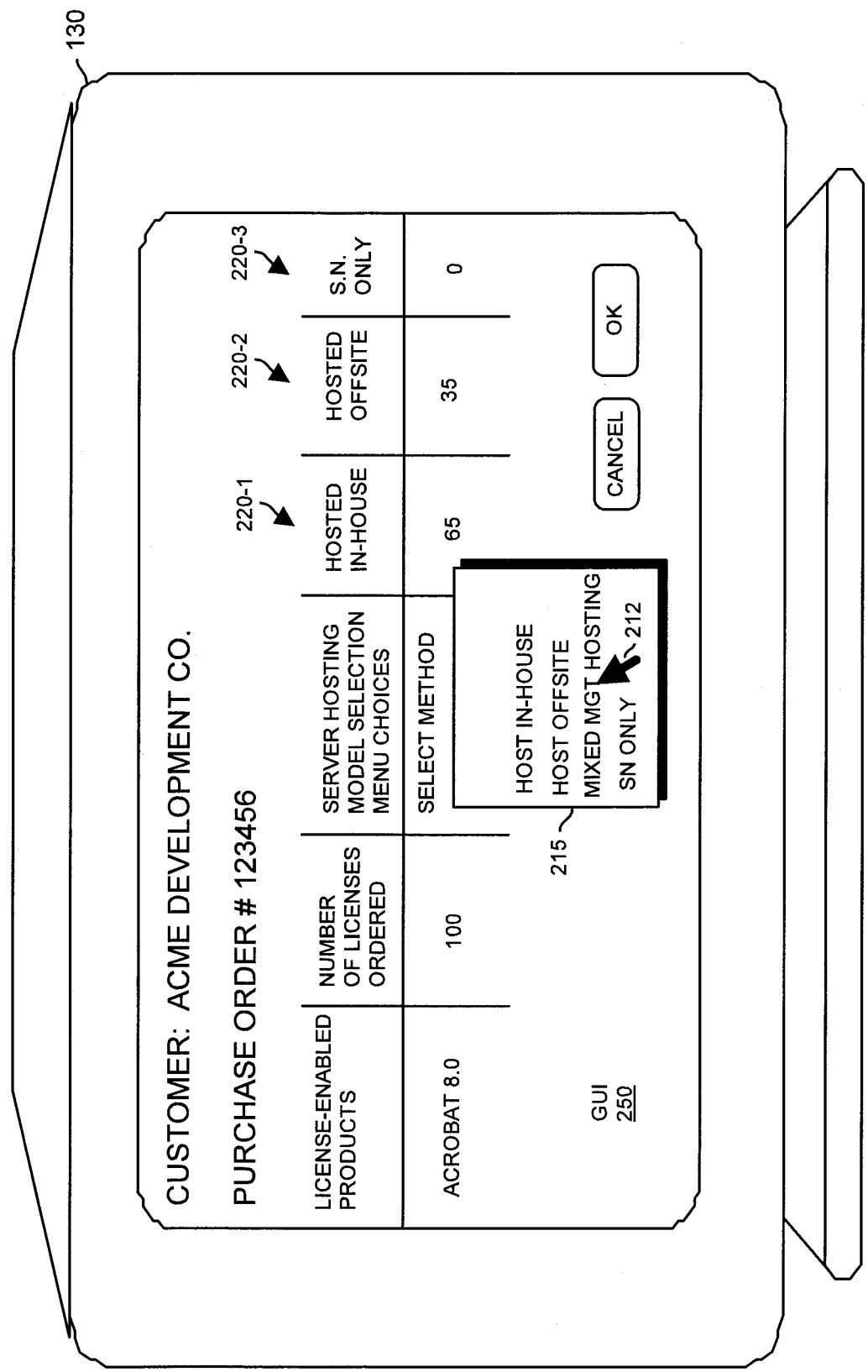
FIG. 2 is a diagram illustrating a graphical user interface enabling a respective customer to select different modes for distributing software licenses according to embodiments herein.

FIG. 2 is a diagram illustrating use of a graphical user interface 250 to provide a respective customer with license distribution options according to embodiments herein. For example, in response to receiving a request to access a respective web page for managing distribution of software licenses associated with the order 151 (FIG. 1), the license distribution manager 140 initiates display of the graphical user interface 250 on display screen 130 for viewing by user 108.

According to one configuration, the graphical user interface 250 displays details associated with the customer's order 151 such as the name of the customer (e.g., Acme Development Company in this example), a purchase order number (e.g., 123456) associated with the order being reviewed on display screen 130, and a listing of the types and number of licenses in the order. In this example, the customer has purchased 100 licenses of Acrobat™ 8.0. Thus, 100 clients 165 associated with the purchaser (e.g., Acme Development Company or user 108 in this example) can obtain a respective one of the purchased software licenses enabling use of Acrobat™ 8.0. Graphical user interface 250 can include multiple rows of different purchased software licenses identifying how many of a particular license are part of a respective purchase order.

In the context of the present example, the graphical user interface 250 initially displays default entry values to zero in each of column 220-1, column 220-2, and column 220-3 to indicate that no distribution selections have yet been made by the customer.

As will be discussed, the customer (e.g., user 108) can apportion the licenses for distribution in a manner such that server 160 is enabled to distribute at least one software license of the multiple software licenses associated with the order 151 and that computer system 110 is enabled to distribute at least one software license of the multiple software licenses. Alternatively, the user 108 can assign server 160 to distribute all of the licenses associated with order 151 while the computer system 110 is assigned to distribute none of the licenses. Also, the user 108 can assign computer system 110 to distribute all of the licenses associated with order 151 while the server 160 is assigned to distribute none of the licenses. Yet further apportionment information by the user 108 enables the respective user 108 to specify a number of licenses to be distributed via a serial number only as will be discussed further in this specification. As indicated above, server 160 could be outsourced to a third party and hosted on a third party network (one other than network 191 and vendor managed licensing system 183), accessed via the public network 190.

Menu 215 of graphical user interface 250 provides the user 108 with different possible options for managing distribution of the purchased software licenses. For example, menu 215 indicates (by respective column headings) that the software licenses can be "hosted in-house," "hosted off-site," or hosted by "serial number only." The user 108 can prompt display of menu 215 and corresponding selectable commands by clicking on the entry "SELECT METHOD."

The number of software licenses designated in column 220-1 (e.g., as labeled by hosted in-house) indicates the number of licenses in the order 151 that are to be distributed by a private server managed by the purchaser of the software licenses such as server 160 managed within network 191. As discussed above, the value in column 220-1 is initially zero but can be adjusted by the user 108 based on appropriate input.

In an example embodiment, server 160 is a local area network protected by a firewall so that unauthorized persons or computer machines are unable to access resources in the network 191. The number of software licenses designated in column 220-2 (e.g., hosted offsite at a vendor managed site) indicates the number of licenses in the order 151 that are to be distributed by a server such as computer system 110 (e.g., a publicly accessible server). The number of software licenses designated in column 220-3 (e.g., hosted offsite) indicates the number of licenses (e.g., electronic licenses) in the order 151 that are managed by license distribution manager 140 and do not require a setup file. In other words, via column 220-3, the user 108 can specify a number of licenses (e.g., serial numbers to be provided directly from the license distribution manager 140 to user 108) for distribution without requiring any software set up on the part of the user 108.

In the present example as shown in graphical user interface 250 of FIG. 2, the user 108 can click on the entry "MIXED MANAGEMENT HOSTING" in menu 215 to specify that the software licenses associated with the order 151 (FIG. 1) shall be apportioned for distribution by multiple server sources. The "MIXED MANAGEMENT HOSTING" entry in the graphical user interface 250 prompts or enables the user 108 to modify values in columns 220 in accordance with the user's desire to allocate a specified number of the software licenses for distribution by different types of licensing server sources.

How to or whether to apportion distribution of the software licenses amongst multiple licensing server sources in computer network environment 100 can be based on the following considerations such as which model would best accommodate a customer's environment and general network policies:

1.) Do the planned users of the potential software licenses have access to secure sites on the Internet (such as banking or shopping on sites like Amazon.com)? If not, you should host the license pool in-house (skip to the end).

2.) Does your organization have IT resources to install and manage the vendor's License Server Tools in-house? If not, you should host the license pool at vendor's site (skip to the end).

3.) Would you prefer to have fewer configuration options in return for fewer steps to deploy e-license management? (e.g., keeping it as simple as possible) If yes, you should host the license pool at the vendor's site using the serial number only (skip to the end).

4.) Do any of the planned users of the software have limited access to the organization's local area network, whether directly or through a VPN (Virtual Private Network) connection? If yes, you should host the license pool at the vendor site (skip to the end).

5.) Do you actively host and maintain any of the following servers within the perimeter of your firewall: E-mail, FTP (File Transfer Protocol), Web Server, file servers, etc.? If not, you should host the license pool at the vendor site (skip to the end).

6.) Do you actively use any of the following services or applications managed or supplied by a 3rd party (as a hosted service): E-mail, FTP (e.g., File Transfer Protocol), Web Server, CRM (e.g., salesforce.com), and mail filters (postini), etc.? If yes, you could have mixed hosting for your pool, some in-house (for stationary users) and some at the vendor's publicly accessible website (for remote or mobile users). If not, you should host the license pool in-house.

In the present example, assume that the user 108 decides to host a portion of software licenses in house as well as have the vendor distribute a portion of the licenses over a publicly accessible website. In this instance, the user 108 selects appropriate entries in menu 215 and provides input (e.g., types values in the columns 220) to indicate that 65 of the 100 licenses shall be hosted in house (e.g., hosted by server 160 of network 191) while 35 of the 100 licenses shall be hosted offsite (e.g., hosted by license distribution manager 140).

Figure 3:
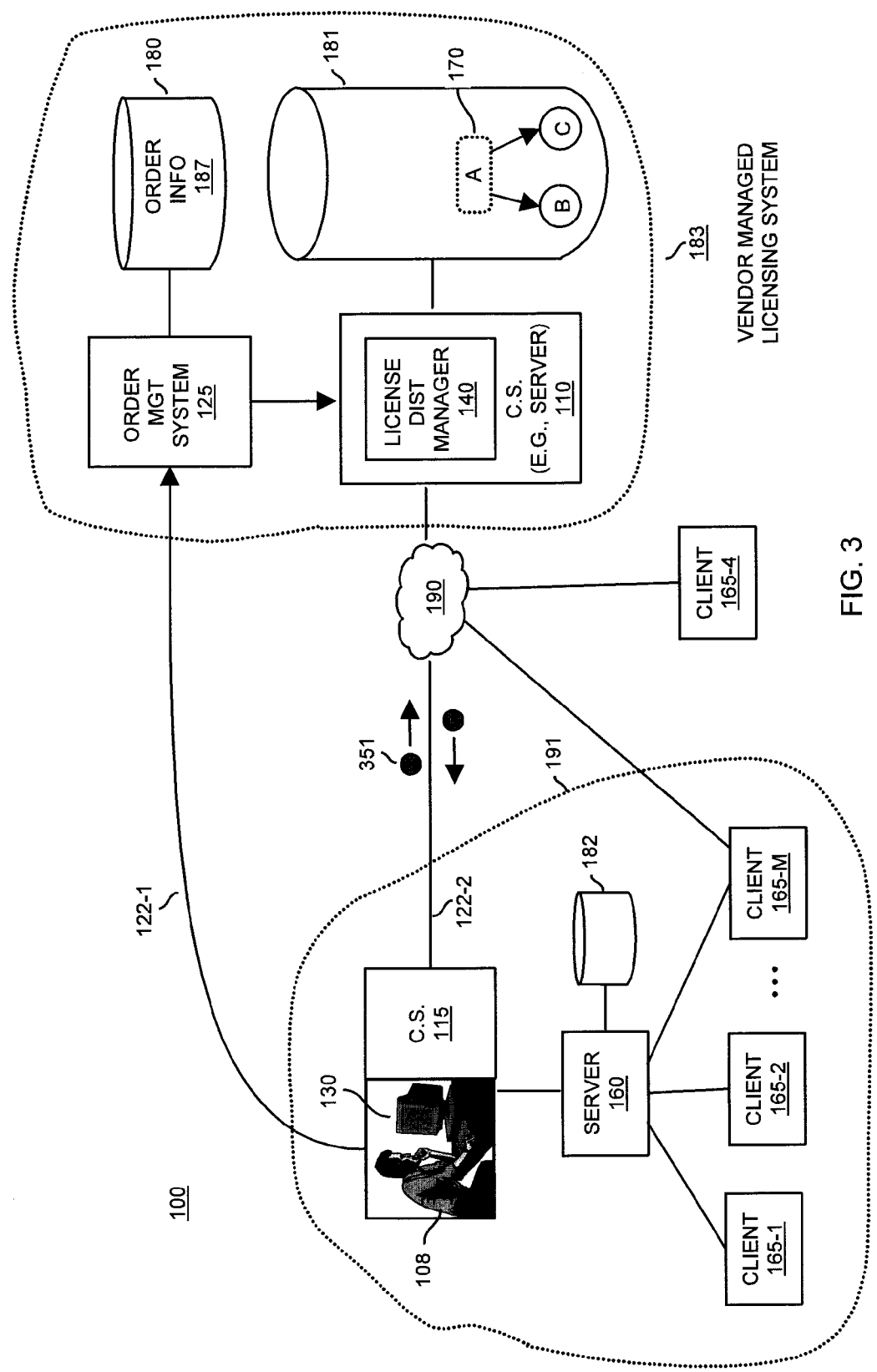
FIG. 3 is a diagram illustrating selection of a distribution method, splitting of a license pool associated with a customer order, and downloading of utility tools enabling distribution management according to embodiments herein.

As shown in FIG. 3, upon user selection of the OK button via cursor 212 (e.g., a selection tool on display screen 130 operated by a hand-operated mouse), computer system 115 initiates forwarding of the distribution selection information 351 (e.g., a number of software licenses to be hosted in house and hosted off-site as shown in columns 220) over communication link 122-2 and network 190 (e.g., the Internet) to license distribution manager 140. Receipt of distribution selection information 351 prompts the license distribution manager 140 to split pool of licenses 170 (associated with order 151) into multiple license pools. For instance, in the context of this example, the license distribution manager 140 initiates separation of the pool of licenses 170 into license pool B (including 65 software licenses and corresponding information of the 100 purchased software licenses) and license pool C (including 35 software licenses and corresponding information of the 100 purchased software licenses).

License distribution manager 140 can be configured to distribute the software licenses in license pool C to clients 165 having access to computer system 110. For example, client 165-M, client 165-P, . . . , client 165-Q can communicate over network 190 (e.g., the internet) to access license distribution manager 140 to obtain a respective software license. Software licenses for clients 165 also can be delivered via phone communications, e-mail, USB (Universal Serial Bus) token, fax, human operator, etc. Certain clients (e.g., client 165-1 and client 165-2) may not have the ability to communicate over network 190 and access a respective software license from computer system 110. For example, in one embodiment, the network 191 is operated by a defense contractor having only a limited number of the computers, if any, that are able to access the Internet (e.g., sometimes referred to as the Internet and/or world wide web).

Assume that server 160 has not yet been configured to distribute software licenses to clients 165. To enable distribution of software licenses associated with order 151 (FIG. 1), the license distribution manager 140 provides a number of utilities to computer system 115. For example, the license distribution manager 140 can download utilities 154 to computer system 115 or the user 108 can retrieve the utility tools to enable user 108 to manage distribution of software licenses via server 160.

Figure 4:
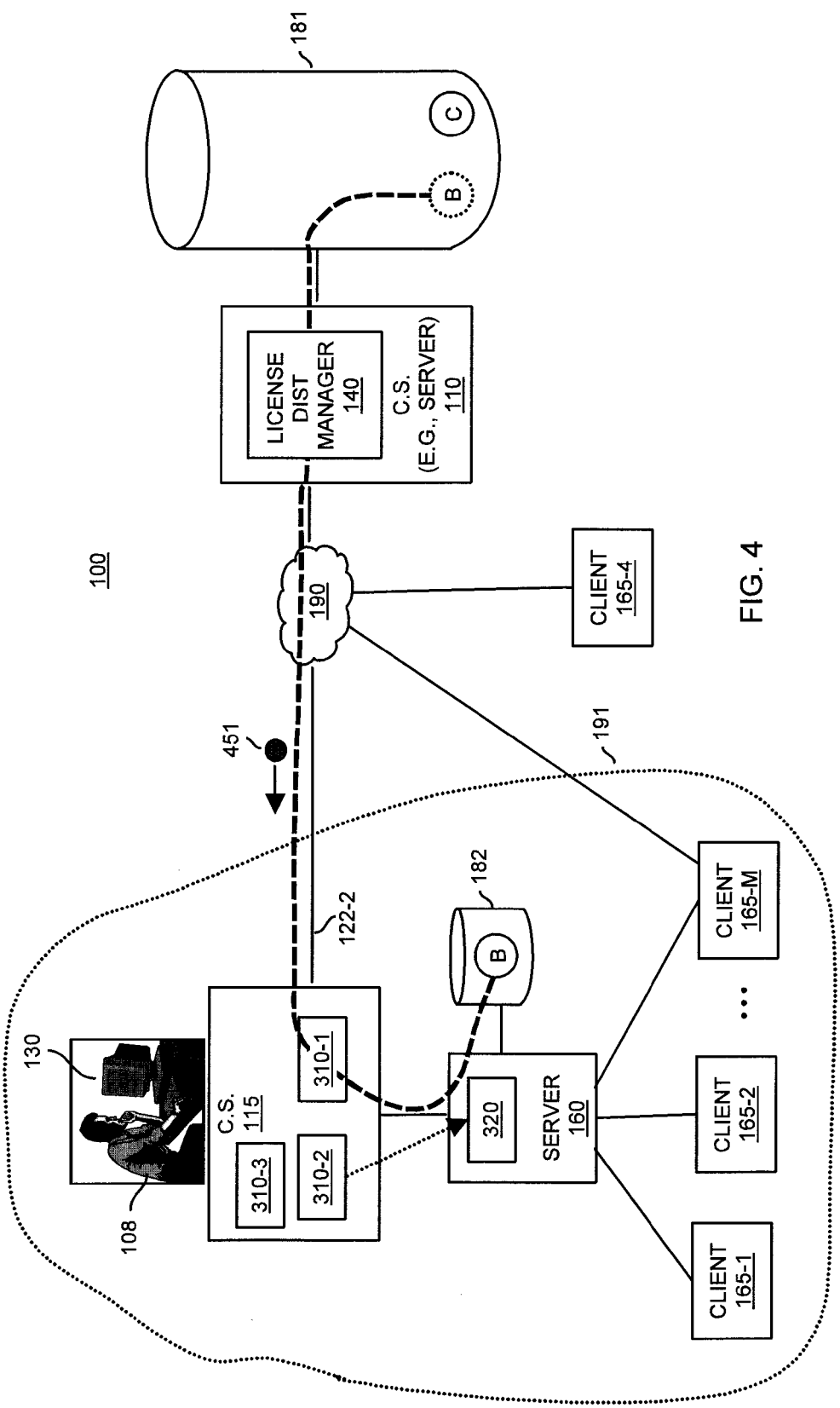
FIG. 4 is a diagram illustrating forwarding of a license pool for distribution at a remote location according to embodiments herein.

More specifically, FIG. 4 is a diagram illustrating downloading and use of multiple utilities from license distribution manager 140 to support distribution management according to embodiments herein.

In the example embodiment shown, via communication 451, the license distribution manager 140 provides utility 310-1 (e.g., a charge utility tool or license pool utility), utility 310-2 (e.g., server software), utility 310-3 (e.g., administration software) to computer system 115. Note that the user 108 at computer system 115 executes the utilities 310 to carry out different functions as further discussed below.

For example, retrieval and subsequent execution of utility 310-1 at computer system 115 enables the user 108 to populate repository 182 with license pool B (e.g., license information associated with the 35 software licenses designated to be hosted by an in-house server such as by server 160 as discussed above). Thus, utility 310-1 can be viewed as a charge utility tool.

According to one configuration, via graphical user interface 250, the user 108 specifies a type of operating system that will be used to run the license distribution manager 320 (e.g., server software). Additionally, the user 108 downloads and/or retrieves a license server setup file (e.g., an XML file) from the license distribution manager 140. The license server setup file includes information required by the utility 310-1 to retrieve the license pool B (e.g., a group of e-licenses) for storage in repository 182. In other words, the license server setup file enables the user 108 to charge server 160 with the software licenses in license pool B corresponding to order 151.

An example of a license server setup file (e.g., a setup file) for charging or transferring license pool B to repository 182 is as follows:

```
<?xml version="1.0" encoding="UTF-8" ?>
- <AdobeConfig xmlns="http://www.adobe.com/alm/2005/AdobeConfig">
- <!-- Adobe License Server Setup File
    Note: This file is to be used with the utility to download
        e-licenses to an in-house Adobe License Server
        deployed by the customer.
    This file must NOT be edited in any way.
-->
<AdobeConfigVersion>1.1</AdobeConfigVersion>
- <!--
xx Begin of NON-Editable Section xxxxxxxxxxxxxxxxxxxxxxxxxxxxxxxxxxxxxxxxxxxxxxxxx
xxxxxxxxxxxx
    WARNING: Do NOT modify any of the content below this
point. Modification of any of the values below this line will
invalidate the digital signature preventing licenses to be
downloaded to your in-house License Server successfully.
-->
- <LicenseServers>
- <Server>
<Description>Adobe License Server</Description>
<ServerURL>https://practivate.adobe.com/servlets/inet/licsrv</ServerURL>
<Signature> (appropriate signature here) </Signature>
</Server>
</LicenseServers>
- <LicenseInfo>
<LicenseServerHostingModel>AdobeHosted</LicenseServerHostingModel>
<DistributionModel>Volume</DistributionModel>
<Licensee>Acme Development Company</Licensee>
<LicenseeID>(appropriate ID inserted here)</LicenseeID>
- <EntitlementData>
<LicenseModel>PerSeat</LicenseModel>
<EntitlementId>AcrobatProfessional-8.0-ALL-PS-LOC</EntitlementId>
<Count>2</Count>
</EntitlementData>
<Signature>(appropriate signature here)</Signature>
</LicenseInfo>
- <!--
End of NON-Editable Section xxxxxxxxxxxxxxxxxxxxxxxxxxxxxxxxxxxxxxxxxxxxxxxxx
xxxxxxxxxxxxxxx
-->
</AdobeConfig>
```

One implementation according to embodiments herein is to use a license server setup file as discussed above, but it would be possible to obtain a pool of license information by providing some other means of identification. For example, the utility 310-1 (e.g., charging utility) can obtain the license from license distribution manager 140 either using a server setup file (as described) or authenticate itself with the distribution manager 140 to select (through a respective interface) the amount of licenses designated in pool B.

In addition to utility 310-1 as discussed above, the license distribution manager 140 can enable transmission of utility 310-2 over network 190 to computer system 115. Execution of utility 310-2 enables user 108 to configure server 160 with license distribution manager 320. License distribution manager 320 can be a software application executed by the server 160, enabling respective clients 165 to obtain as many as 35 licenses from server 160 so that the clients 165 are able to install and execute the software (e.g., Acrobat™ 8.0) identified in the purchase order (e.g., order 151 in FIG. 1).

According to one embodiment, during corresponding operation, the license distribution manager 320 executing on server 160 locally keeps track of distribution of the software licenses to clients 165. For example, after distribution of a first software license to a respective one of clients 165 in network 191, the license distribution manager 320 reduces the number of available software licenses to a value of 34. The licensing distribution manager 320 derives the value (e.g., 34) by subtracting one from the original number (e.g., 35) of available software licenses. After distribution of another software license to a client in network 191, the license distribution manager 320 reduces the number of available software licenses to a total number of 33; and so on until there are no licenses left to distribute.

Note that the software licenses (e.g., electronic licenses or e-licenses) as discussed above can be permanently, pseudo-permanently, or temporarily (e.g., a floating license) assigned for use by respective clients 165. For the latter two cases, if a respective client relinquishes use of a respective software license by notifying licensing distribution manager 320, the licensing distribution manager adds the relinquished software license back to the available license pool B in repository 182. Accordingly, the licensing distribution manager 320 can re-distribute the license to another client.

In addition to utility 310-1 and utility 310-2, the license distribution manager 140 can provide utility 310-3 over network 190 to computer system 115. Utility 310-3 enables the user 108 to manage license distribution manager 320. For example, in one embodiment, utility 310-3 includes a graphical user interface enabling the user 108 to further control a distribution of software licenses in license pool B to clients 165 as well as view status information indicating how many of the software licenses are available for use by other clients.

Certain clients 165 (e.g., client 165-1 and client 165-2) may not have access to network 190 but may have access within the confines of network 191. Such clients 165 are, thus, unable to obtain licenses distributed by license distribution manager 140 of computer system 110. The above method of configuring server 160 to distribute licenses from license pool B in repository 182 simplifies the overhead associated with license distribution because the clients 165 can obtain respective licenses over a network connection rather than via conventional distribution methods.

As previously discussed, according to one configuration, the clients 165 communication with one or both of server 160 and computer system 110 to obtain a respective license (e.g., e-license) to use a respective software application. This can involve use of a specific URL (Uniform Resource Locator) enabling the clients 165 to access server 160 and obtain an e-license. A respective license server source (e.g., server 160 and/or computer system 110) may require that a respective client 165 meet certain conditions before giving out an authentication code (e.g., software license) to the client. For example, the client attempting to obtain an e-license from server 160 may be required to provide a password or other information at the discretion of the network administrator.

When satisfied with the appropriate password or identification information provided by a client, the server 160 provides the client with a serial number or authentication code enabling use of the vendor's software. The client inputs the received authentication code to the application in order to execute the application and use its features.

In addition to distributing e-licenses, the server 160 can be configured to distribute the vendor's software to clients. Computer system 110 also can be configured to distribute the vendor's software as well.

The following code illustrates a truncated example of a setup file used by a respective client to obtain a license from the server 160:

```
<?xml version="1.0" encoding="UTF-8" ?>
-<AdobeConfig xmlns="http://www.adobe.com/alm/2005/AdobeConfig">
- <!--
Adobe Software Application—Client License Setup File for Customer-hosted Licenses (in-house). This file specify customer preferences, license and product configuration information. Please edit the fields that are in the "Customer Editable Section" only.
NOTE: This file MUST be included with the installation of the Adobe application on every user's machine.
-->
<AdobeConfigVersion>1.1</AdobeConfigVersion>
- <!--
** BEGIN of Customer Editable Section: User Preferences
**************************************
LicenseDownloadOptions: specify whether the end-user will see the license download dialogs and options or not. Configurable by the customer.
   Values:
   Verbose: the user sees the "Download e-License" dialog.
   SilentLicenseDownload: the application attempts to download an e-license without displaying any message to the user. The application displays a message in case of errors and allows the user to initiate a grace period.
   AllSilent: the application attempts to download an e-license without displaying any message to the user. The application does not display any messages to the user and initiates the grace period silently
NOTE: The user will only gets a message when the grace period expires.
```

LicenseServers: specify one or more in-house license servers setup by the customer. This option shall be completed in preparation for the deployment of the Adobe application to the end-users' machines. Instructions (to be completed for every license server in your organization):
1. Type a description for your in-house Adobe License Server.
2. Enter the Server URL for your in-house server using the format
   <PortNumber>@<ServerURL> where,
   PortNumber: is the port your server is listening for requests
   ServerURL: is the fully qualified URL of your server

```
--<
- <UserPreferences>
  <LicenseDownloadOptions>AllSilent</LicenseDownloadOptions>
  </UserPreferences>
- <LicenseServers>
- <Server>
  <Description>My License Server Description</Description>
  <ServerURL>Port_Number@Server_URL</ServerURL>
  </Server>
  </License Servers>
- <!--
** END of Customer Editable Section
*********************************************
***
-->
- <!--
xx Begin of NON-Editable Section
xxxxxxxxxxxxxxxxxxxxxxxxxxxxxxxxxxxxxxxxxxxxx
xxxxxxxxxxxx
NOTE: Do NOT modify any of the content below this point. Modification of any of the values below this line will invalidate the digital signature preventing the application to obtain an electronic license successfully.
-->
- <LicenseInfo>
  <LicenseServerHostingModel>InHouse</LicenseServerHostingModel>
  <DistributionModel>Volume</DistributionModel>
  <Licensee>Acme Development Company </Licensee>
  <LicenseeID>1122334455</LicenseeID>
- <EntitlementData>
  <LicenseModel>PerSeat</LicenseModel>
  <ProductIdentifier>99</ProductIdentifier>
  <TrialASR>PD94bWwgdm . . . . . . . . . .
  0MEI0RUU5NENBQUQ3ODkzQzQwMD1GOTRFQ
  kRFOTk5QkI0RkZCMkJFQjgwNjQ3REMzRUI2NTwv
  U21nbmF0dXJ1Pg0KPC9BY3R
  pdmF0aW9uU3B1Y21maWNhdG1vb1J1Y29yZD4NCg
  ==<RepairASR>
  <EntitlementId>AcrobatStandard-8.0-ALL-PS-LOC</EntitlementId>
  </EntitlementData>
- <EntitlementData>
  <LicenseModel>PerSeat</LicenseModel>
  10<ProductIdentifier>98</ProductIdentifier>
  <TrialASR>PD94bWwgdm . . . . . . . . . . . . . . . . . .
  xNjwvU21nbmF0dXJ1Pg0KPC9BY3RpdmF0aW9uU3B1
  Y21maWNhdG1vb1J1Y29yZD4NCg==</RepairASR>
```

```
<EntitlementId>AcrobatProfessional-8.0-ALL-PS-
LOC</EntitlementId>
    </EntitlementData>
    - <EntitlementData>
    <LicenseModel>PerSeat</LicenseModel>
    <ProductIdentifier>97</ProductIdentifier>

<TrialASR>PD94bwwgdmvyc21vbj0iMS . . . . . . . . . . . . .
D1GNz1DRTFCNTdGRDMxODY5NDgxNTMwNEUw
MEY8L1NpZ25hdHVyZT4NCjwvQWN0aXZhdG1vb1
NwZWNpZm     1jYXRpb25    SZWNvcmQ+DQo=</TrialASR>

<RepairASR>PD94bwwgdmVyc21vbj0iMS4wIiB1bmNv .
. . . . . . . . . . . . . . . . . . . . . . . . . . TMwQjdCNzc
wRTRFND1CODQ3RTVCOTIwNkI3NkQ2N0Q2NDE8L
1NpZ25hdHVyZT4NCjwvQW
N0aXZhdG1vb1NwZWNpZm1jYXRpb25SZWNvcmQ+
DQo=</RepairASR>
    <EntitlementId>Acrobat3D-8.0-ALL-PS-LOC</EntitlementId>
    </EntitlementData>
    <Signature> (appropriate signature here) </Signature>
    </LicenseInfo>
    - <!--
    End of NON-Editable Section xxxxxxxxxxxxxxxxxxxxxxxxxxxxxxxxxxxxxxxxxxxxxxxxxx
xxxxxxxxxxxxxxxx
    -->
    </AdobeConfig>
```

Figure 5:
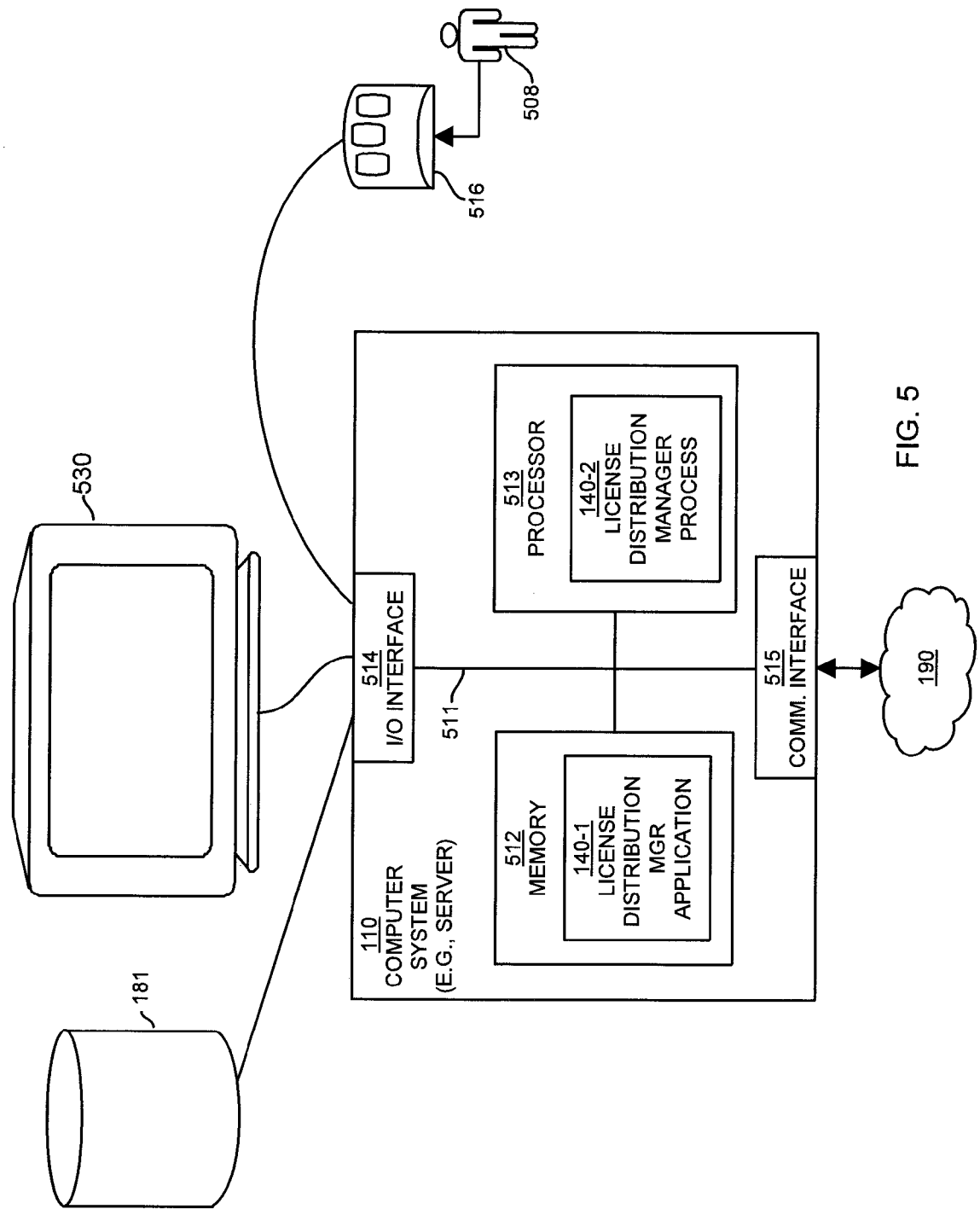
FIG. 5 is an example of a computer environment and corresponding computer system for executing a license distribution manager application according to embodiments herein.

FIG. 5 is a block diagram of a computer environment 100 illustrating an example architecture of a respective computer system 110 (e.g., a server) for implementing license distribution manager 140 (e.g., license distribution manager application 140-1 and/or license distribution manager process 140-2) according to embodiments herein. Computer system 110 can be a computerized device such as a personal computer, workstation, portable computing device, console, network terminal, processing device, network device, etc.

As shown, computer system 110 of the present example includes an interconnect 511 that couples a memory system 512, a processor 513, I/O interface 514, and a communications interface 515. I/O interface 514 provides connectivity to peripheral devices 516 (if such devices are present) such as a keyboard, mouse (e.g., selection tool), display screens (e.g., display medium 530), etc. User 508 can provide input to computer system 110. Communications interface 515 enables computer system 110 to communicate over network 190 to retrieve and transmit information as previously discussed.

As shown, memory system 512 is encoded with license distribution manager application 140-1 that supports software license distribution as discussed above and as discussed further below. License distribution manager application 140-1 can be embodied as software code such as data and/or logic instructions (e.g., code stored in the memory or on another computer readable medium such as a disk) that supports processing functionality according to different embodiments described herein. During operation of one embodiment, processor 513 accesses memory system 512 via the use of interconnect 511 in order to launch, run, execute, interpret or otherwise perform the logic instructions of the license distribution manager application 140-1. Execution of the license distribution manager application 140-1 produces processing functionality in license distribution manager process 140-2. In other words, the license distribution manager process 140-2 represents one or more portions of the license distribution manager application 140-1 performing within or upon the processor 513 in the computer system 110.

It should be noted that, in addition to the license distribution manager process 140-2 that carries out method operations as discussed herein, other embodiments herein include the license distribution manager application 140-1 itself (i.e., the un-executed or non-performing logic instructions and/or data). The license distribution manager application 140-1 may be stored on a computer readable medium such as a floppy disk, hard disk or in an optical medium. According to other embodiments, the license distribution manager application 140-1 can also be stored in a memory type system such as in firmware, read only memory (ROM), or, as in this example, as executable code within the memory system 512 (e.g., within Random Access Memory or RAM).

In addition to these embodiments, it should also be noted that other embodiments herein include the execution of the license distribution manager application 140-1 in processor 513 as the license distribution manager process 140-2. Thus, those skilled in the art will understand that the computer system 110 can include other processes and/or software and hardware components, such as an operating system that controls allocation and use of hardware resources.

Functionality supported by computer system 110 and, more particularly, functionality associated with license distribution manager application 140-1 and license distribution manager process 140-2 will now be discussed via flowcharts in FIGS. 6 through 8. For purposes of the following discussion, the license distribution manager 140 (e.g., license distribution manager application 140-1 and/or editor process 105-2) of computer system 110 generally performs steps in the flowcharts.

Note that there will be some overlap with respect to concepts discussed above for FIGS. 1 through 5. Also, note that the steps in the below flowcharts need not always be executed in the order shown.

Figure 6:
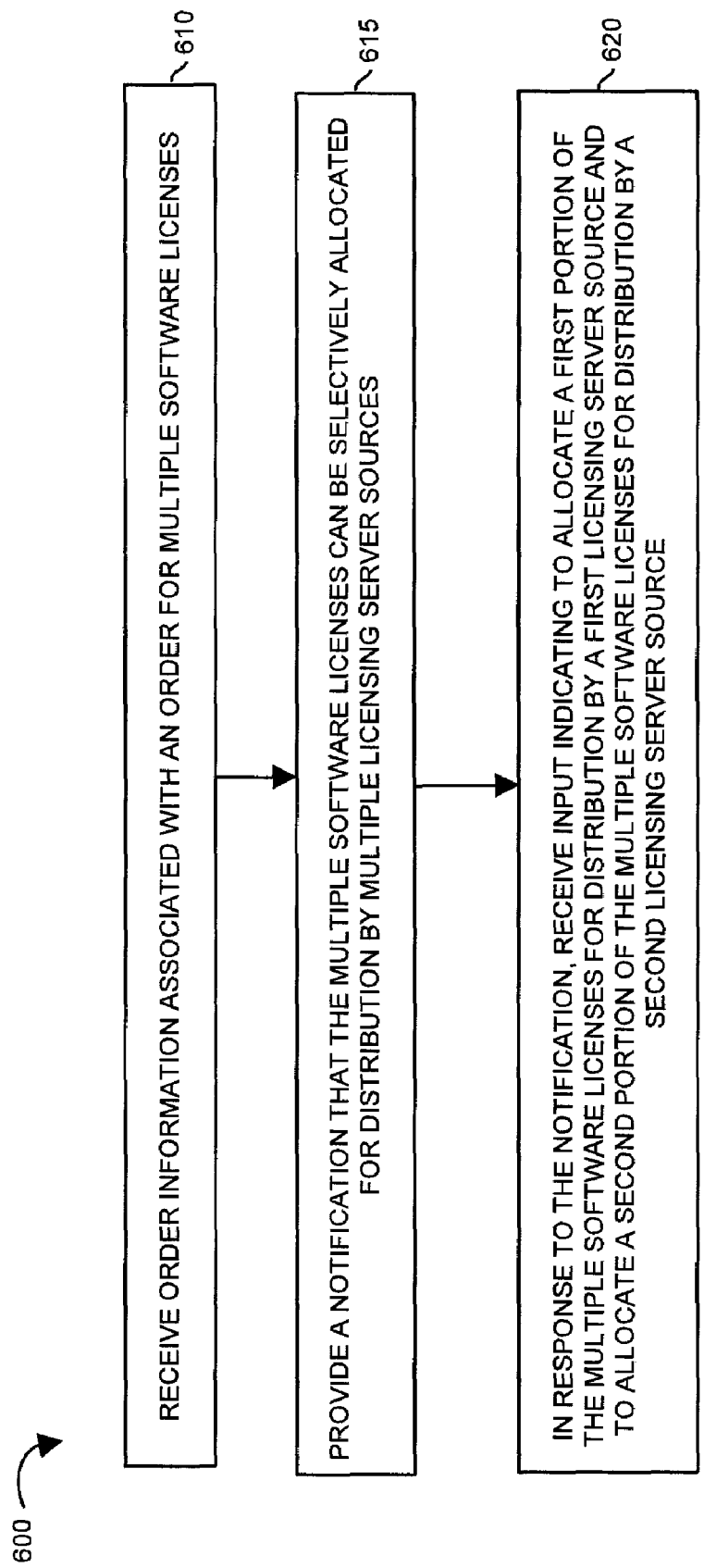
FIG. 6 is a flowchart illustrating a general technique enabling distribution of software licenses according to embodiments herein.

FIG. 6 is a flowchart 600 illustrating a technique facilitating a distribution of software licenses according to embodiments herein. Note that flowchart 600 of FIG. 6 and corresponding text below will make reference to matter previously discussed with respect to FIGS. 1-5.

In step 610, the license distribution manager 140 of computer system 110 receives order information associated with an order 151 for multiple software licenses.

In step 615, the license distribution manager 140 provides a notification that the multiple software licenses associated with order 151 can be selectively allocated for distribution by one or multiple licensing server sources (e.g., server 160 and/or computer system 110).

In step 620, in response to providing the notification, the license distribution manager 140 receives input indicating to allocate a first portion (e.g., 35) of the multiple software licenses (e.g., 100 ordered software licenses) for distribution by a first licensing server source (e.g., the computer system 110) and to allocate a second portion (e.g., 65) of the multiple software licenses for distribution by a second licensing server source (e.g., server 160).

Figure 7:
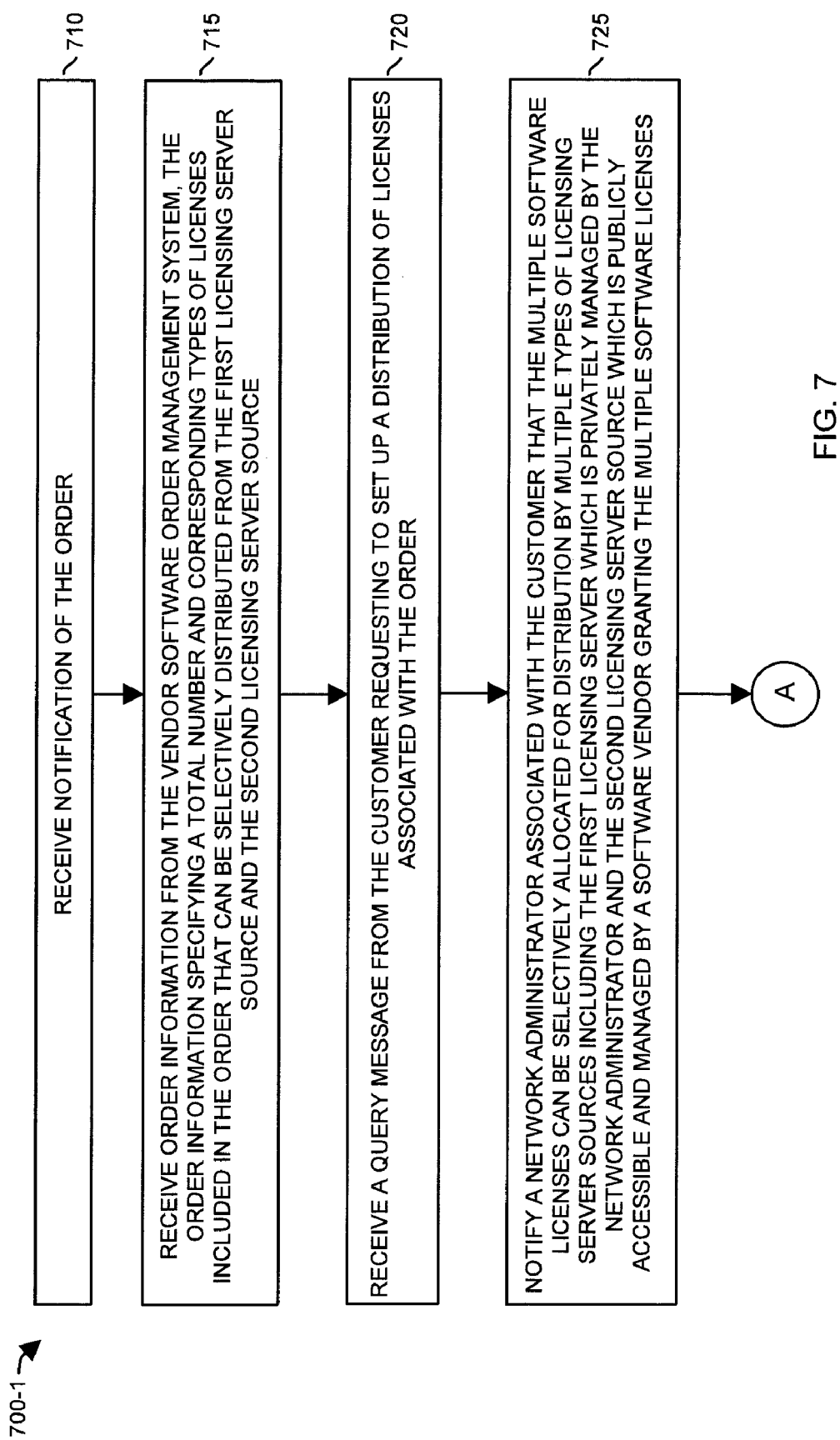
FIGS. 7 and 8 combine to form a flowchart illustrating more specific techniques of distributing software licenses according to embodiments herein.
Figure 8:
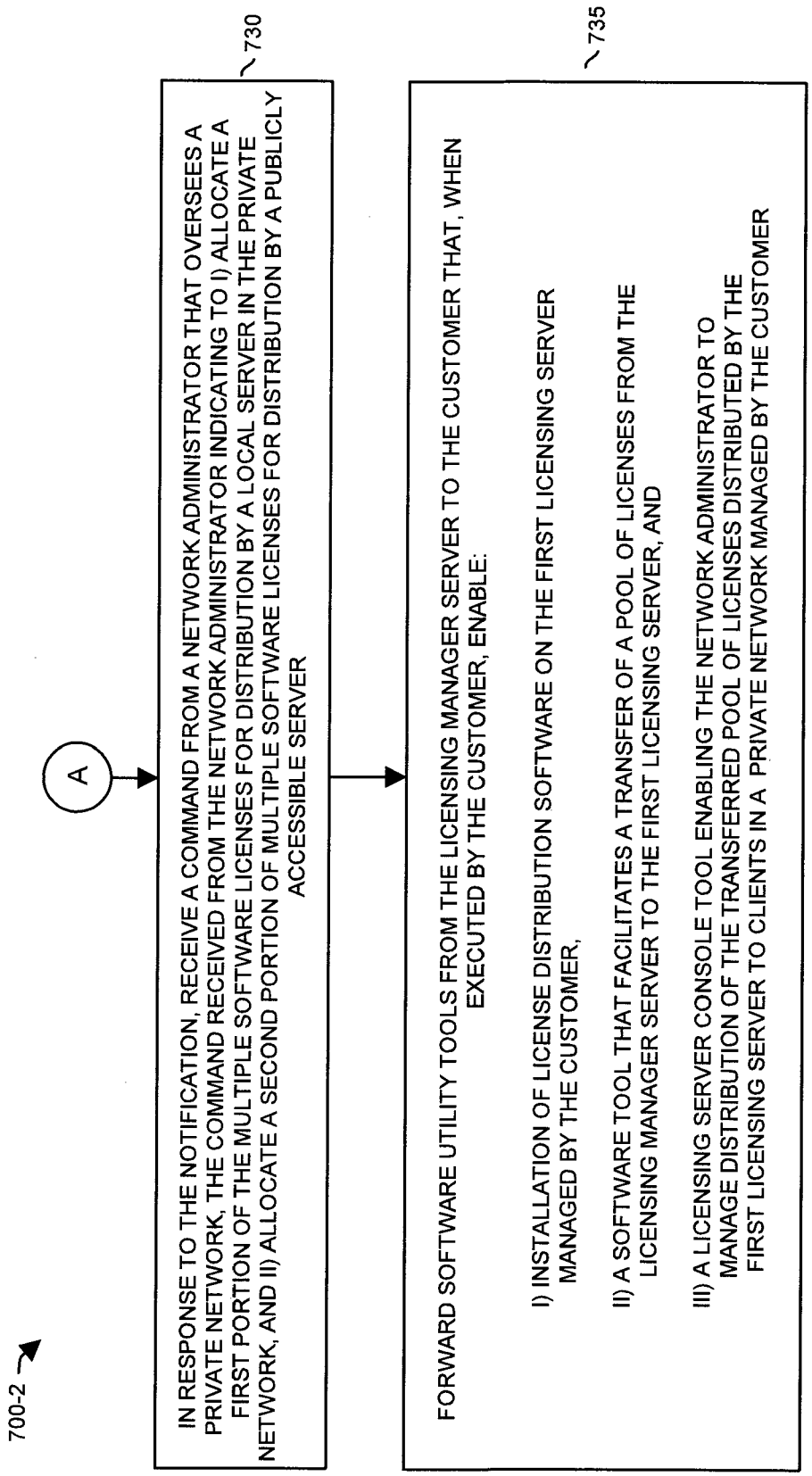

FIGS. 7 and 8 combine to form a flowchart 700 illustrating more specific techniques associated with embodiments herein. Note that according to the present example embodiment, the steps in flowcharts 700-1 and 700-2 (collectively, flowchart 700) are carried out by a processing entity such as license distribution manager 140. However, the entity (e.g., computer system, combination of computer systems, server, etc.) that executes the operational steps below can vary depending on the configuration.

In step 710, the license distribution manager 140-1 receives notification of the order 151 for software licenses.

In step 715, the license distribution manager 140-1 receives order information from the vendor software order management system 125. The order information specifies information such as a total number and corresponding types of licenses included in the order 151 that can be selectively distributed from one or more servers.

In step 720, the license distribution manager 140-1 receives a query message from a customer (e.g., entity placing the order 151) requesting to set up a distribution of licenses associated with the order 151.

In step 725, the license distribution manager 140-1 notifies a network administrator (e.g., user 108) associated with the customer that the multiple software licenses can be selectively allocated for distribution by multiple types of licensing server sources including server 160 (e.g., a first licensing server source) which is privately managed by the customer (e.g., user 108) and computer system 110 (e.g., a second licensing server source) which is publicly accessible and managed by a software vendor granting the multiple software licenses.

In step 730, the license distribution manager 140-1 receives a command from a user 108 (e.g., a network administrator) that oversees the customer's private network (e.g., network 191). The command received from the user 108 indicates to i) allocate a first portion of the multiple software licenses for distribution by server 160 in network 191, and ii) allocate a second portion of multiple software licenses for distribution by computer system 110 (e.g., a publicly accessible server) over network 190.

In step 735, the license distribution manager 140-1 forwards software utility tools 310 to the customer associated with order 151. The utilities 310, when executed by the customer, enable:

i) installation of license distribution software (e.g., license distribution manager 320) on server 160 managed by the user 108, ii) a software tool (e.g., utility 310-1) that facilitates a transfer of a pool of licenses from license distribution manager 140 (e.g., a licensing manager server) to the server 160, and iii) a licensing server console tool (e.g., utility 310-3) enabling the user 108 to manage distribution of the transferred pool of licenses (e.g., license pool B) to clients in network 191.

Note again that techniques herein are well suited for distribution of software licenses. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A computer-implemented method in which at least one computer system executes instructions retrieved from computer storage, the computer-implemented method comprising:

at the at least one computer system, receiving, from a customer, order information associated with an order for multiple software licenses;

in response to receiving the order information, creating a pool of licenses including the multiple software licenses;

providing a notification to the customer that the multiple software licenses can be designated for distribution by multiple licensing server sources;

in response to the notification, receiving input from the customer indicating to designate a first portion of the multiple software licenses for distribution by a first licensing server source and to designate a second portion of the multiple software licenses for distribution by a second licensing server source;

in response to receiving the input indicating to designate the first portion of the multiple software licenses for distribution by the first licensing server source and to designate the second portion of the multiple software licenses for distribution by the second licensing server, splitting the pool of licenses associated with the order into a first license pool including the first portion of the multiple software licenses and a second license pool including the second portion of the multiple software licenses; and after splitting the pool of licenses:

forwarding the first license pool including the first portion of the multiple software licenses over a network to the first licensing server source, the first licensing server source operated by the customer for distributing the first portion of the multiple licenses to clients in a private network that is managed by the customer purchasing the multiple software licenses; and forwarding the second license pool to the second licensing server source, the second license server source distributing licenses in the second license pool from the second licensing server source via communications over a publicly shared communication network, the second licensing server source operated by a vendor that creates the multiple software licenses;

subsequent to receiving the input and configuring the first licensing server source to distribute the first portion of the multiple software licenses and configuring the second software licensing server source to distribute the second portion of the multiple software licenses, receiving a reallocation message from the customer purchasing the multiple software licenses, the reallocation message indicating a different allocation of the multiple software licenses than as specified by the input; and in response to receiving the reallocation message, initiating designation of at least one software license that is initially designated for distribution by the first licensing server source for distribution by the second licensing server source instead.

2. A computer-implemented method as in claim 1, wherein providing the notification includes:

notifying the customer that the multiple software licenses can be designated for distribution by multiple types of licensing server sources including the first licensing server which is privately managed by the customer and the second licensing server source which is publicly accessible as well as operated by a software vendor granting the multiple software licenses.

3. A computer-implemented method as in claim 1, wherein providing the notification includes:

notifying a network administrator that the multiple software licenses can be designated for distribution by multiple types of licensing server sources including the first licensing server source and the second licensing server source; and wherein receiving the input includes receiving a command from a network administrator that oversees the private network, the command received from the network administrator indicating to i) designate the first portion of the multiple software licenses for distribution by a local server operated by the customer in the private network, and ii) designate the second portion of multiple software licenses for distribution by a publicly accessible server.

4. A computer-implemented method as in claim 1, wherein receiving order information occurs in response to communicating with a vendor software order management system that manages the order for the multiple software licenses, the order information specifying a total number as well as corresponding types of licenses included in the order.

5. A computer-implemented method as in claim 1, wherein providing the notification that the multiple software licenses can be designated for distribution by multiple sources includes supplying an indication in the notification that the multiple software licenses can be distributed as electronic licenses enabling activation of software produced by the vendor granting the multiple software licenses.

6. A computer-implemented method as in claim 1, wherein providing the notification that the multiple software licenses can be designated for distribution by multiple sources occurs in response to receiving a query message over the publicly accessible network from the customer requesting to set up a distribution of licenses associated with the order.

7. A computer-implemented method as in claim 1 further comprising:
enabling a web portal; and
wherein providing the notification occurs in response to receiving, from the web portal, a customer inquiry associated with the multiple software licenses.

8. A computer-implemented method as in claim 1 further comprising:
via a web portal, forwarding license distribution software to a customer associated with the order, the license distribution software enabling distribution of software licenses from the first licensing server source when installed on the first licensing server source.

9. A computer-implemented method as in claim 8 further comprising:
via the web portal, forwarding a charge utility tool that facilitates a transfer of the first license pool from a license managing server to the first licensing server source that executes the license distribution software to distribute the first portion of the multiple software licenses.

10. A computer-implemented method as in claim 8 further comprising:
via the web portal, forwarding a licensing server console tool to the customer enabling the customer to manage, via communication between the licensing server console tool and the license distribution software, a distribution of the first portion of the multiple software licenses.

11. A computer-readable storage medium having instructions stored thereon for processing data information, such that the instructions, when carried out by a processing device, the processing device programmed to perform the operations of:
receiving, from a customer, order information associated with an order for multiple software licenses;

in response to receiving the order information, creating a pool of licenses including the multiple software licenses;

providing a notification to the customer that the multiple software licenses can be designated for distribution by multiple licensing server sources;

in response to the notification, receiving input from the customer indicating to designate a first portion of the multiple software licenses for distribution by a first licensing server source and to designate a second portion of the multiple software licenses for distribution by a second licensing server source;

in response to receiving the input indicating to designate the first portion of the multiple software licenses for distribution by the first licensing server source and to designate the second portion of the multiple software licenses for distribution by the second licensing server, splitting the pool of licenses associated with the order into a first license pool including the first portion of the multiple software licenses and a second license pool including the second portion of the multiple software licenses; and after splitting the pool of licenses:

forwarding the first license pool including the first portion of the multiple software licenses over a network to the first licensing server source, the first licensing server source operated by the customer for distributing the first portion of the multiple licenses to clients in a private network that is managed by the customer purchasing the multiple software licenses; and forwarding the second license pool to the second licensing server source, the second license server source distributing licenses in the second license pool from the second licensing server source via communications over a publicly shared communication network, the second licensing server source operated by a vendor that creates the multiple software licenses;

subsequent to receiving the input and configuring the first licensing server source to distribute the first portion of the multiple software licenses and configuring the second software licensing server source to distribute the second portion of the multiple software licenses, receiving a reallocation message from the customer purchasing the multiple software licenses, the reallocation message indicating a different allocation of the multiple software licenses than as specified by the input; and in response to receiving the reallocation message, initiating designation of at least one software license that is initially designated for distribution by the first licensing server source for distribution by the second licensing server source instead.

12. A computer-readable storage medium as in claim 11, wherein providing the notification includes:
notifying the customer that the multiple software licenses can be designated for distribution by multiple types of licensing server sources including the first licensing server which is privately managed by the customer and the second licensing server source which is publicly accessible as well as operated by a software vendor granting the multiple software licenses.

13. A computer-readable storage medium as in claim 11, wherein providing the notification includes:
notifying a network administrator that the multiple software licenses can be designated for distribution by multiple types of licensing server sources including the first licensing server source and the second licensing server source; and wherein receiving the input includes receiving a command from a network administrator that oversees the private network, the command received from the network administrator indicating to i) designate the first portion of the multiple software licenses for distribution by a local server in the private network, and ii) designate the second portion of multiple software licenses for distribution by a publicly accessible server.

14. A computer-readable storage medium as in claim 11, wherein receiving order information occurs in response to communicating with a vendor software order management system that manages the order for the multiple software licenses, the order information specifying a total number as well as corresponding types of licenses included in the order.

15. A computer-readable storage medium as in claim 11, wherein providing the notification that the multiple software licenses can be designated for distribution by multiple sources includes supplying an indication in the notification that the multiple software licenses can be distributed as electronic licenses enabling activation of software produced by the vendor granting the multiple software licenses.

16. A computer-readable storage medium as in claim 11, wherein providing the notification that the multiple software licenses can be designated for distribution by multiple sources occurs in response to receiving a query message over the publicly accessible network from the customer requesting to set up a distribution of licenses associated with the order.

17. A computer-readable storage medium as in claim 11 further supporting operations of:
    enabling a web portal; and
    wherein providing the notification occurs in response to receiving, at the web portal, a customer inquiry associated with the multiple software licenses.

18. A computer-readable storage medium as in claim 11 further supporting operations of:
    via a web portal, forwarding license distribution software to a customer associated with the order, the license distribution software enabling distribution of software licenses from the first licensing server source when installed on the first licensing server source.

19. A computer-readable storage medium as in claim 18 further supporting operations of:
    via the web portal, forwarding a charge utility tool that facilitates a transfer of the first license pool from a license managing server to the first licensing server source that executes the license distribution software to distribute the first portion of the multiple software licenses.

20. A computer-readable storage medium as in claim 18 further supporting operations of:
    via the web portal, forwarding a licensing server console tool to the customer enabling the customer to manage, via communication between the licensing server console tool and the license distribution software, a distribution of the first portion of the multiple software licenses.

21. A computer system comprising:
    a processor;
    a memory unit that stores instructions associated with an application executed by the processor; and
    an interconnect coupling the processor and the memory unit, enabling the computer system to execute the application and perform operations of:
    receiving, from a customer, order information associated with an order for multiple software licenses;
    in response to receiving the order information, creating a pool of licenses including the multiple software licenses;
    providing a notification to the customer that the multiple software licenses can be designated for distribution by multiple licensing server sources;
    in response to the notification, receiving input from the customer indicating to designate a first portion of the multiple software licenses for distribution by a first licensing server source and to designate a second portion of the multiple software licenses for distribution by a second licensing server source;
    in response to receiving the input indicating to designate the first portion of the multiple software licenses for distribution by the first licensing server source and to designate the second portion of the multiple software licenses for distribution by the second licensing server, splitting the pool of licenses associated with the order into a first license pool including the first portion of the multiple software licenses and a second license pool including the second portion of the multiple software licenses; and
    after splitting the pool of licenses:
    forwarding the first license pool including the first portion of the multiple software licenses over a network to the first licensing server source, the first licensing server source operated by the customer for distributing the first portion of the multiple licenses to clients in a private network that is managed by the customer purchasing the multiple software licenses; and
    forwarding the second license pool to the second licensing server source, the second license server source distributing licenses in the second license pool from the second licensing server source via communications over a publicly shared communication network, the second licensing server source operated by a vendor that creates the multiple software licenses;
    subsequent to receiving the input and configuring the first licensing server source to distribute the first portion of the multiple software licenses and configuring the second software licensing server source to distribute the second portion of the multiple software licenses, receiving a reallocation message from the customer purchasing the multiple software licenses, the reallocation message indicating a different allocation of the multiple software licenses than as specified by the input; and
    in response to receiving the reallocation message, initiating designation of at least one software license that is initially designated for distribution by the first licensing server source for distribution by the second licensing server source instead.

22. A computer-implemented method as in claim 1, wherein providing the notification includes:
    prior to configuration of either the first licensing server source or the second licensing server source for distribution of the multiple software licenses, notifying the customer that the multiple software licenses can be allocated for distribution by multiple different types of licensing server sources.

23. A computer-implemented method as in claim 1 further comprising:
    configuring the first licensing server source to maintain status information indicating a number of licenses in the first license pool that are available for distribution by the first licensing server source; and
    modifying the status information in response to reassignment of the at least one software license for distribution by the second licensing server source.

24. A computer-implemented method as in claim 1 further comprising:

enabling distribution of the first portion of the multiple software licenses from the first server source;

enabling distribution of the second portion of the multiple software licenses from the second server source; and subsequent to enabling distribution of the multiple software licenses from the first licensing server source and the second licensing server source, via a browser operated by the customer purchasing the multiple software licenses, providing the customer of the multiple software licenses access to status information indicating which, if any, of the multiple software licenses are currently available for distribution to and use by members of an organization managed by the customer.

25. A computer-implemented method as in claim 1 further comprising:

configuring the first licensing server source to keep track of which licenses of the first license pool have been distributed for use of corresponding vendor software; and initiating distribution of a license management utility to the customer, execution of the license management utility enabling the customer to communicate with the first licensing server source and retrieve status information indicating which, if any, of the multiple software licenses have been distributed for use.

26. A computer-implemented method as in claim 22 further comprising:

initiating distribution of an installation tool to the customer of the multiple software licenses, the installation tool enabling the customer to configure the first licensing server source for distribution of the first portion of software licenses.

27. A computer-implemented method as in claim 26 further comprising:

initiating distribution of a software tool to a purchaser of the multiple software licenses, the software tool enabling the purchaser to transfer the first portion of the multiple software licenses to the first licensing server source, the first licensing server source enabling distribution of the first portion of software licenses for distribution over a private network under management of the purchaser.

\* \* \* \* \*